United States Patent [19]

Rauch

[11] Patent Number: 4,635,030

[45] Date of Patent: Jan. 6, 1987

[54] STATUS DISPLAY SYSTEM

[75] Inventor: Sol Rauch, Nepean, Canada

[73] Assignee: Canadian Marconi Company, Montreal, Canada

[21] Appl. No.: 716,972

[22] Filed: Mar. 28, 1985

Related U.S. Application Data

[63] Continuation-in-part of Ser. No. 635,839, Jul. 30, 1984, abandoned, which is a continuation-in-part of Ser. No. 414,919, Sep. 3, 1982, abandoned.

[51] Int. Cl.$^4$ .................. B60Q 1/00; G08B 25/00
[52] U.S. Cl. .................. 340/52 F; 340/52 R; 340/519; 340/520; 340/521; 340/525; 340/721; 340/945; 340/973; 340/825.5; 364/424
[58] Field of Search .................. 340/52 F, 52 R, 521, 340/519, 517, 525, 726, 721, 945, 825.5, 973, 980, 520, 523; 364/424, 551

[56] References Cited

U.S. PATENT DOCUMENTS

| | | | |
|---|---|---|---|
| 3,431,557 | 3/1969 | Thomas et al. | 340/507 |
| 3,643,252 | 2/1972 | Roberts, Jr. | 340/726 |
| 3,713,090 | 1/1973 | Dickinson | 340/945 |
| 3,798,596 | 3/1974 | Sumiyoshi et al. | 340/52 F |
| 3,988,730 | 10/1976 | Valker | 340/519 |
| 4,092,642 | 5/1979 | Green et al. | 340/521 |
| 4,196,413 | 4/1980 | Sowa | 340/519 |
| 4,212,064 | 7/1980 | Forsythe et al. | 340/945 |
| 4,231,025 | 10/1980 | Turner, Jr. | 340/521 |
| 4,250,484 | 2/1981 | Parke | 340/521 |
| 4,287,503 | 9/1981 | Sumida | 340/52 F |
| 4,356,470 | 10/1982 | Kogawa et al. | 340/52 F |
| 4,401,971 | 8/1983 | Saito et al. | 340/519 |
| 4,414,539 | 11/1983 | Armer | 340/511 |
| 4,484,302 | 11/1984 | Cason et al. | 340/721 |

Primary Examiner—Donnie L. Crosland
Attorney, Agent, or Firm—Fishman & Dionne

[57] ABSTRACT

The invention relates to a status display system for aircraft which system receives signals from sensors/-transducers monitoring a plurality of parameters and subsystems of the aircraft. The system then displays text identifying faulty ones of the parameters or subsystems in a prioritized sequence. With the system of the invention, only a single indicator is needed to identify a plurality of faults as compared to available systems wherein each parameter and subsystem is monitored by a separate device including a separate display. Thus, the present invention is an improvement over the prior art in that: (1) it requires less cockpit space for displaying faults, and; it presents faults in order of priority so that the pilot does not have to make decisions about the most important fault to attend to when, as in the prior art systems, faced with a plurality of fault indications on a plurality of fault indicators.

19 Claims, 6 Drawing Figures

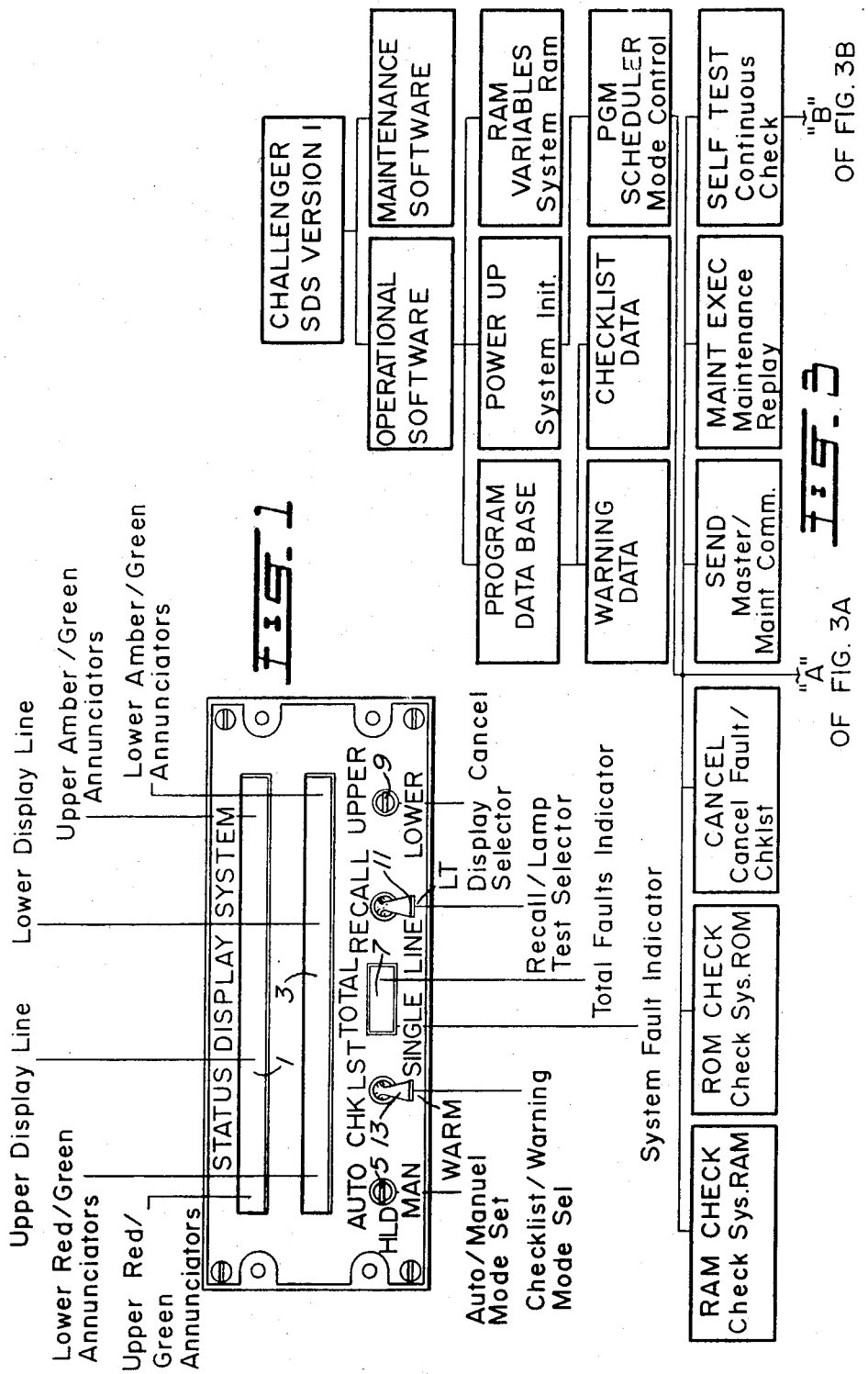

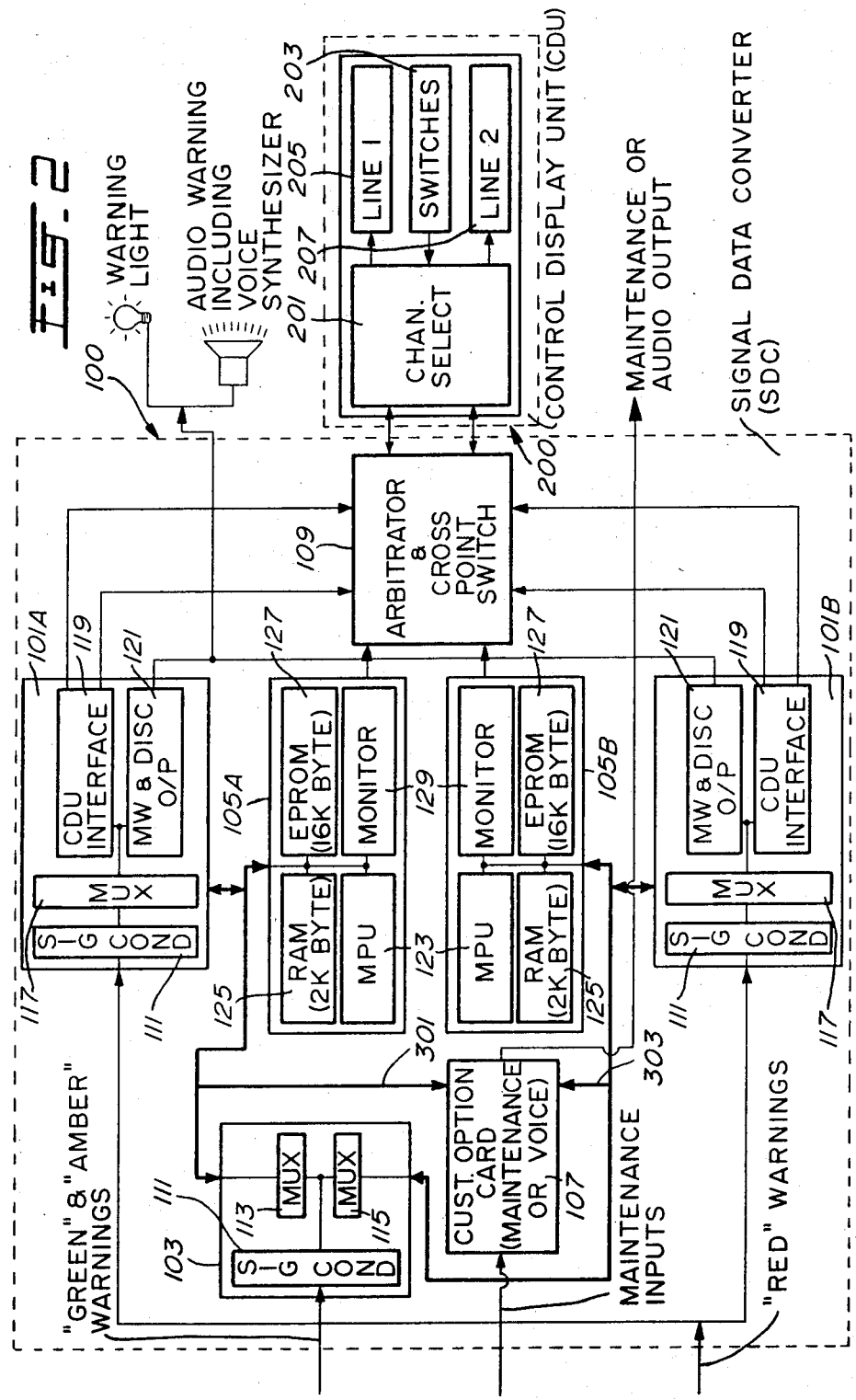

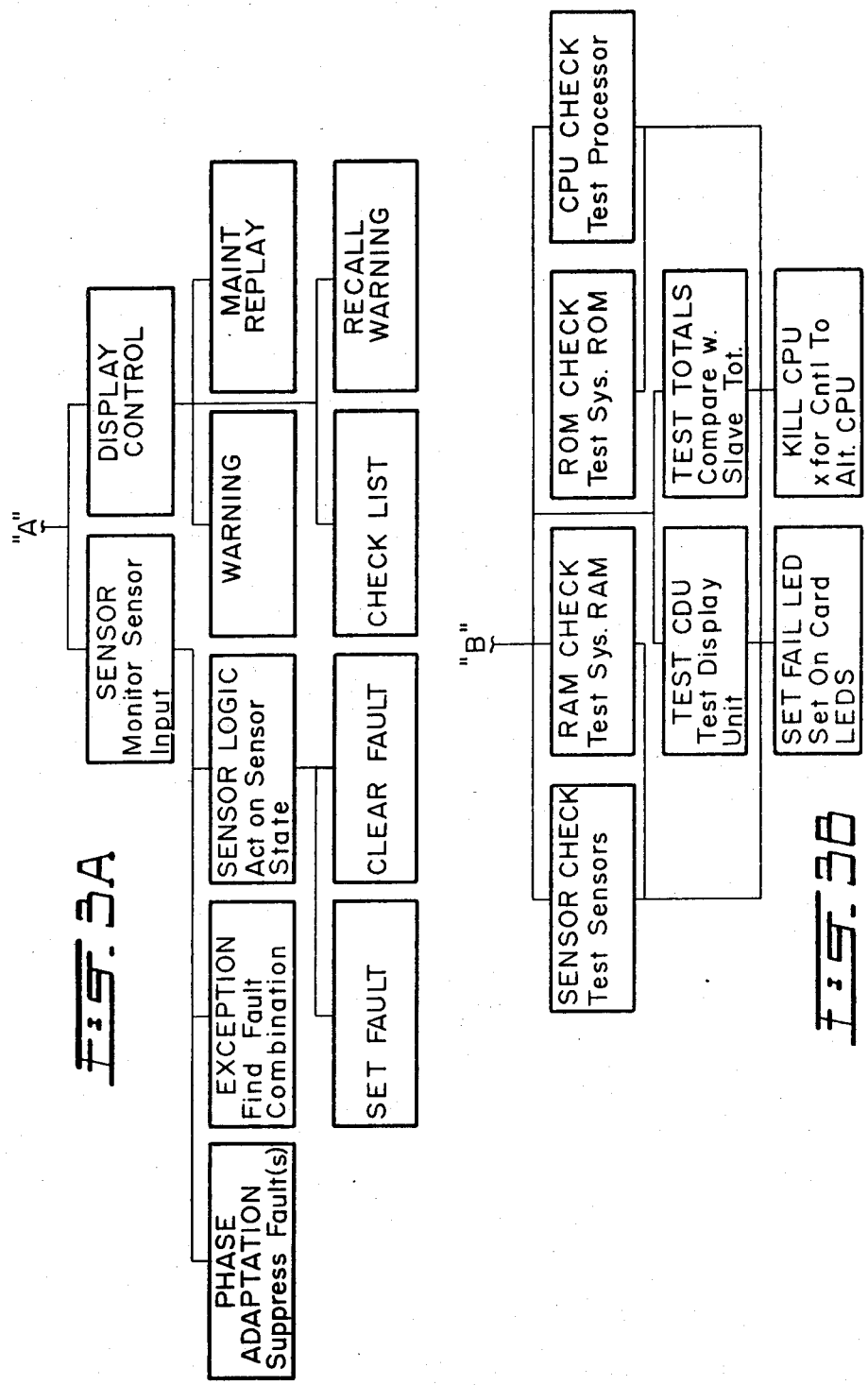

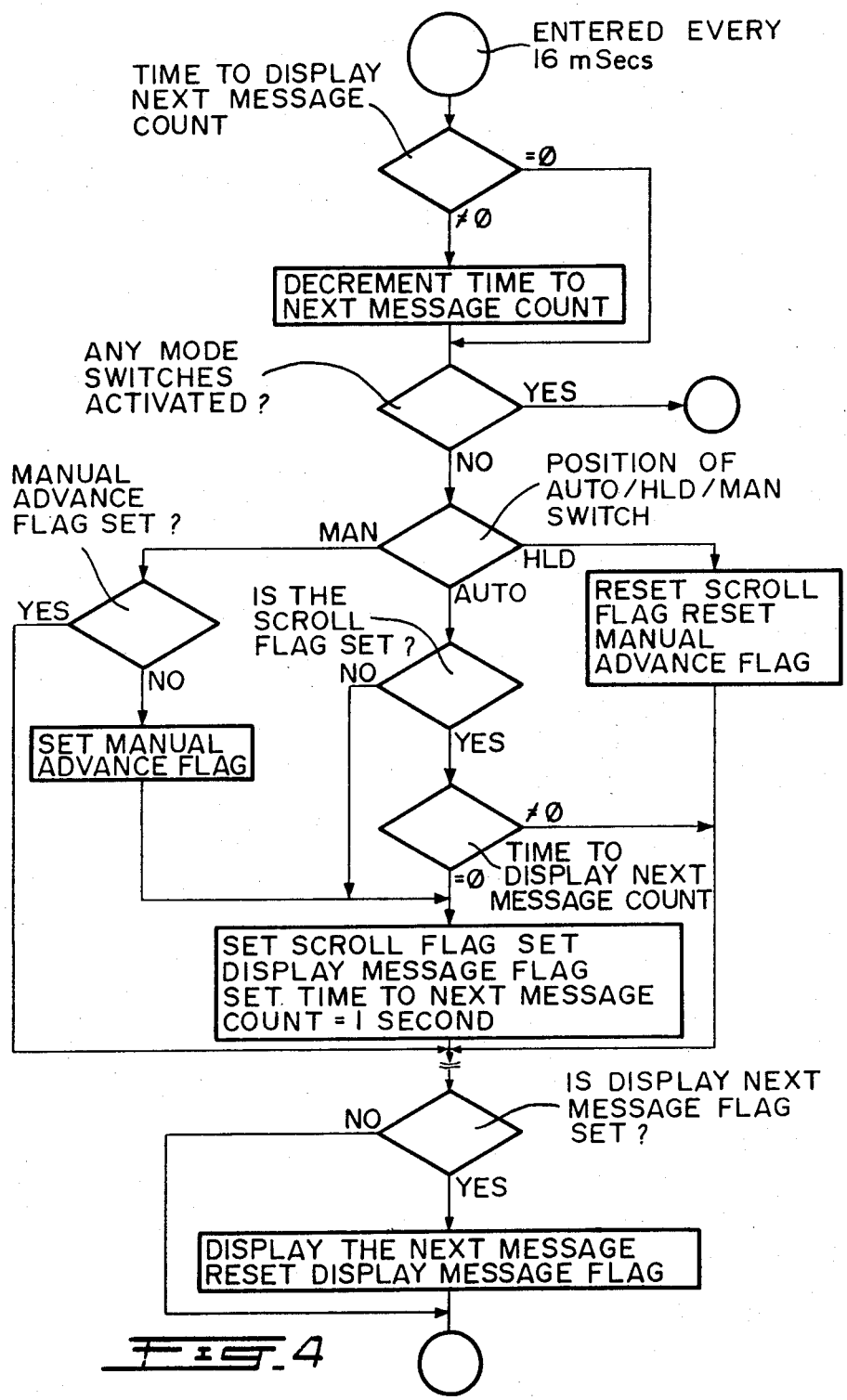

STATUS DISPLAY SYSTEM

CROSS REFERENCE TO RELATED APPLICATIONS

This is a continuation-in-part application of continuation-in-part application Ser. No. 635,839, filed July 30, 1984, which is a continuation-in-part application of parent application Ser. No. 414,919, filed Sept. 3, 1982. The continuation-in-part application Ser. No. 635,839 and the parent application Ser. No. 414,919 have both been abandoned.

BACKGROUND OF INVENTION (a) Field of Invention

The invention relates to a status display system for monitoring aircraft subsystems and parameters, for detecting faults therein, and for indicating the existence of these faults. More specifically, the invention relates to such a system which indicates the faults in order of the priority of the faults, and which uses a non-dedicated display.

(b) Description of the Prior Art

In aircraft employing the above types of systems, it is common to employ dedicated fault annunciators. That is, each possible fault has a corresponding illuminated display indicator. Therefore, in an aircraft, the area required to display all possible faults is determined by the number of such possible faults. With high performance aircraft, the amount of display area required is substantial, but the amount of display area available is minimal. To minimize the required panel space, legends are kept to a minimum size so that at times they are difficult to read. In addition, the large number of indicators makes it difficult for the pilot to effectively monitor all the faults as he can only absorb so much information at any time.

In addition. if further faults are to be monitored, inconvenient and difficult physical changes have to be made to the cockpit instrument panel.

In the operation of a cockpit panel, when several fault messages appear, the pilot has to determine very quickly which message is most critical and should therefore be acted on immediately. During emergency conditions, such as when multiple subsystems fail, this adds considerably to the pilot's workload.

Modern day electronics has generated new systems applications that are finding their way into modern cockpits. Each system has its own controls/display unit to interface with the pilot. These require valuable cockpit instrument panel space and provide an even heavier burden for the pilot.

The dedicated fault annunciator system is particularly wasteful of cockpit instrument panel space with regards to each indicator when there is no message to be displayed on that indicator which, under normal conditions, is the situation.

In othe fields, systems have been devised for the purpose of monitoring several different parameters and providing a single display for the indication of faults therein. Such systems are illustrated in, for example, U.S. Pat. Nos. 4,231,025, Turner, Jr., Oct. 28, 1980 and 4,250,484, Parke, Feb. 10, 1981. U.S. Pat. No. 4,092,642, Green et al, May 30, 1978, teaches such a system which also places a priority for display on the faults detected. However, the systems taught in the above-mentioned patents are relatively unsophisticated and are therefore not suitable for high performance aircraft wherein a large number of parameters must be monitored and all of these parameters must be arranged in order of priority so that the highest priority fault is first displayed on a non-dedicated display.

SUMMARY OF INVENTION

It is therefore an object of the invention to provide a status display system for aircraft overcoming the disadvantages of the present faults enenciator systems in aircraft.

It is a more specific object of the invention to provide such a system which uses a non-dedicated display.

It is a still further object of the invention to provide such a system which displays the existence of faults in the order of priority of these faults.

In accordance with the invention there is provided a status display system for aircraft for receiving signals from sensors/transducers monitoring a plurality of parameters and subsystems of the aircraft and for providing a display to identify faulty ones of the parameters or subsystems in a prioritized sequence. The system includes a signal data converter (SDC) having input means for receiving the signals and output means, means for presenting indications of the faulty parameters and subsystems, the means for presenting having input means and output means. The SDC output means are connected to the means for presenting input means. The SDC includes means for processing the signals to determine which parameters and subsystems are faulty and for determining the priority of faulty ones thereof, and means for transmitting information to the means for presenting relating to the faulty parameters and subsystems and to the priorities thereof. Thus, the means for presenting provides indications to identify the faulty parameters and subsystems in the prioritized sequence.

BRIEF DESCRIPTION OF THE DRAWINGS

The invention will be better understood by an examination of the following description, together with the accompanying drawings, in which:

FIG. 1 is an example of a front face of an indicator in accordance with the invention;

FIG. 2 is a block diagram of a system in accordance with the invention;

FIGS. 3, 3a and 3b are flow charts of software for controlling the system. FIG. 3a is a continuation from A of FIG. 3 and FIG. 3b is a continuation from B of FIG. 3; and FIG. 4 is a flow chart which provides a graphic representation of the software logic used in the scrolling function.

DESCRIPTION OF PREFERRED EMBODIMENTS

The system includes two line replaceable units (LRU's): a control display unit (CDU) and a signal data converter (SDC). The front face of the CDU is shown in FIG. 1. A block diagram of both the CDU and the SDC is shown in FIG. 2.

Referring to FIG. 1, it is contemplated that a status display system in accordance with the invention would have room for displaying two faults simultaneously. In the particular embodiment illustrated, there is an upper display line 1 for displaying the highest priority fault and a lower display line 3 for displaying the next highest priority fault. At the left hand and right hand ends of the display lines are color coded annunciators to indicate the degree of urgency of the fault displayed in the respective display line. As can be seen, the messages can be displayed in large clear and easy to read characters, and the placement of the higher priority on a higher level reduces the workload of the pilot. As will be seen below, message changes are implemented via software changes so that the physical characteristics of the system and the cockpit instrument panel will remain unchanged even when further features are added.

Further features of the system, which will be more fully described, are as follows:

Checklists may be conveniently and safely sequenced through using the same display.

Fault messages which are noted and cannot be acted upon immediately may be cancelled and recalled at a later time.

Fault messages may be stored together with their time of occurrence for read-out at a much later time (e.g. after the aircraft has landed).

Other aircraft parameters, such as air data, air engine speed, etc., may be regularly sampled and stored for read-out at a much later time.

Synthesized voice messages complementing the more critical fault messages can be stored and fed into an intercom system at the appropriate time.

Returning now to the description of FIG. 1, as can be seen, there is an automatic/manual mode set switch 5, having automatic (AUTO), manual (MAN) and hold (HLD) positions. When the system is set in the automatic mode, and when there are two or more faults being processed, the highest priority fault is shown in the upper line with its relevent colour coded annunciators illuminated. Faults of lesser priority are automatically scrolled in succession on the lower line in the automatic mode. To stop the scrolling action, the mode selector switch is placed in the HLD position. From this position, the faults not being displayed can be called up one at a time on the bottom line by selecting manual on the mode selector and stepping through the remaining faults, each depression of the switch changing the fault displayed on the lower line.

At all times, the total number of faults with active inputs to the system which have not been cancelled from the display by means of the cancel switch (which will be discussed below), is displayed numerically in the TOTAL window 7, and the highest priority fault remains on the upper line.

When the manual mode of operation is selected, after the first two faults have been displayed, the display can only be updated by reselecting the manual position on the mode selector, or reverting to the automatic mode. An indication of faults which have not been displayed at least once in this mode is provided by the flashing number appearing in the TOTAL window. When all faults have been displayed, the number stops flashing. This ensures that any new faults are brought to the pilot's attention whenever they occur. The faults which are programmed to also activate the Master Warning/Caution lights (to be discussed below) will activate the Caution lights in addition to flashing the total number.

In the automatic mode, whenever the input signal disappears, because either the fault in the subsystem has disappeared or the pilot has taken the necessary corrective action, the display of the fault will also disappear and the number in the TOTAL window will decrease accordingly. If the disappearing fault was the one displayed on the upper line and other faults are being displayed on the lower line, then the next highest priority fault will be transferred from the lower line to the upper line. If the disappearing fault was on the lower line, it would stop appearing in the scrolled sequence.

In the manual mode, the display will not change but the number in the TOTAL window will decrease. On next selection of manual on the mode selector the display will be updated to show the next current situation.

When a fault disappears on its own, or when a fault disappears because the pilot has taken the necessary corrective action, the display of the fault will disappear from the upper or lower line or from the scroll sequence as appropriate, and the number in the TOTAL window will decrease accordingly. If the fault was displayed on the upper line and other faults are being displayed on the lower line, the next highest priority from the lower line will be transferred to the upper line. If the disappearing fault was on the lower line, it will stop appearing in the scroll sequence. This is in the automatic mode. In the manual mode, the display will not change but the number in the TOTAL window will decrease. On the next selection of the manual mode on the mode selector, the display will be updated to show the next current situation.

It may be desirable at times to remove a fault indication from the CDU display although the fault has not been corrected. In this case, the mode selector 5 is placed in the HOLD position and the fault indication to be removed is located on either the upper or lower line. Moving the CANCEL selector 9 switch to the required position (upper or lower) will remove the corresponding upper or lower line fault indication from the display. Removing the fault indication from the display transfers the fault to a separate memory section of the SDC where it is retained for future display, if required.

Faults which have been removed from the display through the CANCEL selector as above-described can be re-displayed by selecting RECALL on switch 11. If the fault still exists in the subsystem the display will show the original fault indications on the upper line and the word EXISTING will be displayed on the lower line. If the fault has disappeared from the subsystem or the pilot has taken the necessary corrective action in the meantime, when RECALL is selected on switch 11 the display will show the original fault indication on the upper line and the word CLEARED will be displayed on the lower line.

If RECALL is selected on switch 11, and the mode selector switch 5 is placed in the AUTO mode, the recalled faults will scroll through in sequence. During RECALL display, to distinguish this mode from the active warning mode, no coloured warning enunciators light up. The number of faults which have not been cancelled and are therefore awaiting pilot action is shown in the TOTAL window throughout RECALL selection.

Switch 11 can also be set for test purposes. This is accomplished by selecting L/T on switch 11, and the display will show a sequence of test patterns on both the upper and lower lines. The patterns are designed to highlight any failed lamps in the display. In addition, the aircraft type will be momentarily shown on the top line and on the bottom line, the program designator and date for which the system installed has been programmed.

To determine the priority sequence of the subsystem faults to be displayed, discussions are held with the airframe manufacturer, subsystems designers, and operational test pilots. The faults are then stored in the SDC in the priority sequence. Any single fault may have more than one priority status allocated, the different priorities being functions of different current flight mode or the combination of faults currently existing, and the appearnace of a fault on a display at any time will depend on these extraneous factors.

It is also recognized that under certain conditions, that is, prior to engine start, there will be inputs to the SDC which would indicate fault conditions, e.g., low oil pressure, generator off, etc. However, under these conditions the "fault conditions" are really normal. The SDC can be programmed to recognize these "normal" fault conditions and not display the individual faults on the CDU. Any fault which should have been present under these conditions but is absent from the pattern would be displayed as a true fault.

Normal aircraft checklists can be programmed into the system for easy access by the pilot during the aircraft operation. By selecting CHK LST on switch 13 and AUTO modes together, the upper line of the display will scroll through the titles of the checklists contained in the SDC. When the title of the required checklist is displayed, moving the mode selector to HLD will complete the selection process. Each item on the selector checklist is obtained sequentially be depressing the mode selector once to the MAN position. The individual items on the checklist are displayed such that the item appears on the upper line and the action/response required is on the lower line.

On completion of all items on a particular checklist, depression of the mode selector will bring up a display which shows the title of the checklist which has just been displayed on the upper line and the word COMPLETED is displayed on the lower line. If a particular item on a checklist cannot be actioned at the time it appears in the program sequence, it can be removed from that position by selecting UPPER on the switch 9. Before the display can display checklist completed it will now ask for RECALL and the previously cancelled checklist items will be returned to the display by selecting RECALL and using the MAN selection to step through the recalled items. After completion of the recalled items, the checklist title and COMPLETED will be displayed. Continued depression of the MAN switch has no affect on the display.

To select another checklist, the mode selector 5 must be returned to the AUTO position until the required title appears on the upper line of the display.

The reverse situation of the fault pattern recognition feature is the checklist sub-routine in that during certain checklist actions, e.g., engine start-up, it would be normal to monitor correct sequencing of events by seeing fault indications disappear. In this case, activation of the engine start switch automatically brings up a display of symbols, or abbreviations, for the items to be monitored, and as they occur correctly in sequence the symbol, or abbreviation, disappears.

All faults processed by the SDC, in addition to being displayed for corrective action by the pilot, are logged into a separate maintenance memory location within the SDC. Additional maintenance parameter signals can be included in the inputs to the SDC and not included in the caution warning program for display, but retained in the maintenance memory only. These additional inputs are normally discrete overspeed, over temperature or over limit signals from the engine instrumentation, but provision can be made for sampling engine parameters at selected intervals plus flight parameters of altitude, outside air temperature, and airspeed/mach number.

Each item held in this memory location has a time of event and time of clearance, if applicble, associated with it.

On completion of flight or at some convenient interval, a technician can select MAINTENANCE MONITOR on the guarded switch located on the SDC (not shown in the drawings) and obtain a display of all the contents of this memory location by selecting RECALL on the CDU. Flight occurrences are listed in chronological order with the time counted from take-off.

The contents of this memory location can only be cleared by activating an ERASE switch (not shown in the drawings) located on the SDC. A small internal battery is provided to ensure the contents of this memory are not lost when aircraft power is removed from the system.

It is also possible to provide a socket on the SDC for connecting a portable printer or digital cassette recorder to obtain either a print-out of the maintenance data or to use the memory contents for later maintenance analysis.

Turning now to FIG. 2 of the drawings, it will be seen that the system comprises an SDC LRU 100 and a CDU LRU 200. The SDC includes two parallel processing channels. In the event that one of the channels fails, the other channel will still be available for processing.

The input signals are catogorized into warnings (RED) which require immediate action by the pilot, cautions (AMBER) which should be attended to as soon as possible and advisories (GREEN) for information purposes only. The input signals are provided from the outputs of transducers or sensors which monitor different aircraft parameters and subsystems. The signals are classified as RED, AMBER or GREEN by predetermination.

Each processing channel includes sensor input circuits 101 (A and B). As can be seen, the RED warnings are fed in parallel to 101A and 101B to ensure that the RED warnings are fed independently to both processor channels.

The SDC includes a common sensor input circuits arrangement 103. As can be seen, the GREEN and AMBER warnings are fed to 103 which in turn feeds the output thereof to either processor channel.

Each processing channel also includes a central processing unit (CPU) 105 (A and B). Maintenance inputs are fed to customer option circuits 107 which can provide an audio output if required. Switch means 109 monitors both the processors and from the signals it receives determines which of the processors should be driving the CDU. The arbitrator feeds the correct processor output to the CDU via a cross point switch. The determination (arbitrating) function of 109 is largely performed by software, while the cross point switch is basically a software controlled gate. A control signal which is software derived from the software module at the bottom of FIG. 3B (KILL CPU X FER CNTRL to ALT (alternate) CPU) selects the standby redundant CPU.

Each of the sensor input circuits 101 and 103 includes a signal conditioner 111. To understand the purpose of the conditioner, it is first pointed out that the input signals to the SDC are: (a) ground closures; (b) logic voltage levels, or; (c) 28 VDC discretes. The 28 VDC discretes are generated by other aircraft subsystems by taking raw aircraft 28 VDC and switching it through a relay. That is, the subsystem can disconnect the 28 VDC showing that the particular caution/warning situation does not exist, or it can connect the 28 VDC showing that the caution/warning situation does exist. Aircraft 28 VDC is very poor and it can have transients up to 600 volts on it. The function of the signal conditioning circuit is:

(a) Transient protection through the use of zener diodes or transorbs (transorbs are integrated electronic devices which are used to absorb the transients coming in from the multitude of input sensors. These are protection devices which prevent the break-down of interface circuitry by large transient voltages riding on the legitimate input signals.)

(b) Filtering of noise that comes on the 28 VDC lines; and (c) Scaling of the 28 VDC to 5 VDC so that it can be processed by the SCD digital circuitry.

Sensor circuits 103 also includes multiplexers 113 and 115 while sensor circuits 101 include multiplexers 117. Each sensor circuit 101 also includes a CDU interface 119 and a master warning and discrete output means 121. The output of 121 is connected to a master warning light in the cockpit, while the output of 119 is connected, through means 109, to the CDU.

The multiplexer 117 continuously scans the output of the signal conditioner 111. When it senses that a RED warning situation has arisen, it provides a signal to 121 which causes the master warning light in the cockpit to flash and thereby draw the pilot's attention to the RED warning situation.

Each CPU includes a microprocessor unit 123, an active memory 125, a static memory 127, and a monitor 129. In a particular embodiment, the microprocessor unit is INTEL 8085A.

123, 125, 127 and 129 define a stand alone computer card. Static memories 127 are EPROM's and the programs which determine the SDC functions are stored in the EPROM. Intermediate software processing steps which are necessary during operation are carried out in the active memories which are random access memories (RAM). When the system is turned off, the RAM loses its contents while the EPROM does not. The monitor 129 performs an administrative function and checks that everything is functioning as it should. This is, as will be appreciated, a classical mini-computer architecture.

Monitors 129 carry out checks on the processing channels in the mini computer and when either one of them gets an appropriate response, it considers that channel to have failed and therefore arranges for the other channel to take over.

The CDU 200 includes a channel selector 201 which is activated by switches, discussed in relation to FIG. 1, and indicated schematically at 203. In turn, the channel select drives displays in the upper line, indicated schematically at 205 and displays in the lower line, indicated schematically at 207.

In order for the system to perform all of the functions as above-described, the mini-computer is controlled by software in accordance with the overview system software diagram illustrated in FIG. 3 which is self-explanatory.

The scolling function is software controlled as per the software diagram illustrated in FIG. 4 which, once again, is self-explanatory. Referring to FIG. 3A, the software module designated "WARNING" monitors how many warnings are being called for and what is their priority. When there are more than two warnings to be displayed, software in this module automatically puts the most important message on the top line of the display and automatically scrolls the remaining messages on the second line of the display in accordance with the software illustrated in FIG. 4.

The advancing of messages on the SDS display while in any given mode is under control of the AUTO/HLD/MAN switch on the CDU. While the switch is in the center HLD position, the display remains static unless a message is cancelled. Whenever the switch is activated into the MAN position (which is spring return) the message will be advanced one for each activation. When the switch is put into the AUTO position, the messages to be displayed will be scrolled at a rate of approximately 1 every second.

As can be seen, it is relatively simple to add new functions by simply adjusting the software. Further, although a particular flow chart has been illustrated, other approaches could be used within the scope of the invention.

It is also contemplated, in accordance with the invention, in addition to displaying the faults on a CDU, that the faults be presented in an oral fashion. For this purpose, leads 301 and 303 from common sensor input circuit arrangement 103 are connected to circuits 107 which, as mentioned, can include audio means. The audio means can comprise tape recorders, with appropriately recorded phrases which would be controlled by the microprocessor to play back an appropriate phrase indicating a detected fault. Alternatively, the audio means can comprise voice synthesizer means which would be controlled, again, by the microprocessor, to provide appropriate phrases with a voice synthesized output.

It is pointed out, in this respect, that the faults are stored on the customer option card 107 in FIG. 2 which includes a low power consumption memory that is also powered by a small back-up battery. Accordingly, data on the memory is not lost when aircraft power is turned off. The time of occurrence of each fault is not recorded as real time but rather as time since take-off. The start signal may be automatically obtained from a "wait on wheels" sensor, for example, usually found on aircraft. The counted time is obtained by counting the pulses from one of the CPU clock oscillators.

The audio output from 107 could be fed, as is well known in the art, to headsets of various crew members, and/or to loudspeakers in the aircraft.

In addition, the output of 121 can be fed, as seen in FIG. 2, to drive an audio device to provide a load noise signal.

Although FIG. 1 illustrates only an upper and a lower display line, it will of course be obvious to one skilled in the art that more than two display lines could be used, for example, three display lines could also be used, as could four display lines. Obviously, the more display lines used, the more faults which can be displayed. However, the more display lines used, the bigger the CDU has to be, and a compromise must be made as between the advantages of more display lines and the disadvantages thereof.

It is also advantageous, having regard to the display, that the display be made night vision goggle (NVG) compatible. During some military night missions, pilots will wear special infra-red binoculars (NVG's). In accordance with one embodiment of the invention herein, the display output is filtered so that it does not adversely affect the operation of the NVG's.

In this regard, although a single embodiment has been illustrated, this was for the purpose of describing, but not limiting, the invention. Various modifications, which will come readily to the mind of one skilled in the art, are within the scope of the invention as defined in the appended claims.

I claim:

1. A status display system for aircraft for receiving signals from sensors/transducers monitoring a plurality of parameters and subsystems of said aircraft and for providing a display to identify faulty ones of the parameters or subsystems in a prioritized sequence; comprising:
   a signal data converter (SDC) having input means for receiving said signals and output means; and
   means for presenting indications of said faulty parameters and subsystems, said means for presenting having input means and output means;
   said SDC output means being connected to said means for presenting input means;
   said SDC comprising:
   means for processing said signals to determine which parameters and subsystems are faulty and for determining the priority of faulty ones thereof; and
   means for transmitting information to said means for presenting relating to said faulty parameters and subsystems and to the priorities thereof;
   whereby, said means for presenting provides indications to identify the faulty parameters and subsystems in the prioritized sequence;
   wherein said visual display means comprises at least upper and lower lines for presenting text; and
   further including means for displaying the highest priority one of said faulty ones of said parameters on said upper line, and means for scrolling at least some of the remainder of said faulty ones of said parameters in order of priority on at least said lower line.

2. A system as defined in claim 1 wherein said means for processing comprises processing channel means including means for conditioning said signals and means for analyzing said signals.

3. A system as defined in claim 2 wherein said processing channel means comprises two parallel processing channels, each of said processing channels comprising said means for conditioning said signals and said means for analyzing said signals; and
   further including means for selecting one of said processing channels and for transmitting information to said CDU only from said selected one of said channels.

4. A system as defined in claim 3 wherein said signals are classified as warning signals or caution/advisory signals;
   said warning signals being fed directly to said two parallel processing channels; and
   means for receiving said caution or advisory signals and for directing said signals to one of said processing channels.

5. A system as defined in claim 4 and further including a warning means;
   means for turning on said warning means on receipt of a warning signal.

6. A system as defined in claim 5 wherein said warning means comprises warning or caution lights.

7. A system as defined in claim 5 wherein said warning means comprises a master warning light.

8. A system as defined in claim 5 wherein said warning means comprises audio warning means.

9. A system as defined in claim 1 wherein said means for presenting comprises a control display unit (CDU), said output means of said CDU comprising a display face.

10. A system as defined in claim 9 wherein said CDU comprises, on the display face thereof, visual display means; and
    said CDU driving said visual display means.

11. A system as defined in claim 1 wherein said means for presenting comprises audio means.

12. A system as defined in claim 11 wherein said audio means comprises a voice synthesizer.

13. A system as defined in claim 1 wherein a plurality of checklists are programmed into the system;
    means for selecting one of said checklists; and and
    means for sequencing through each of the items in the selected checklist.

14. A system as defined in claim 1 and further including means for logging said faulty ones of said parameters and the times of occurrences thereof.

15. A system as defined in claim 14 and further including means for monitoring selected parameters in addition to said faulty ones of said parameters; and
    means for logging said selected parameters.

16. A system as defined in claim 1 and further including storage means for storing information relating to said faulty ones of said parameters; and
    means for recalling and displaying said information.

17. A system as defined in claim 1 wherein said means for scrolling comprises means for manually scrolling said remainder of said faults on said lower line.

18. A system as defined in claim 1 wherein said means for scrolling comprises means for automatically scrolling said remainder of said faults on said lower line.

19. A system as defined in claim 9 wherein said display face is night vision goggle compatible.

* * * * *